United States Patent
Wang et al.

(10) Patent No.: US 11,132,002 B2
(45) Date of Patent: Sep. 28, 2021

(54) METHOD AND DEVICE FOR DISPLAYING MOTION PATH OF ROBOT AND ROBOT

(71) Applicant: Shenzhen LDRobot Co., Ltd., Shenzhen (CN)

(72) Inventors: Xiaojia Wang, Shenzhen (CN); Liu Chen, Shenzhen (CN); Gaihua Guo, Shenzhen (CN)

(73) Assignee: Shenzhen LDRobot Co., Ltd., Shenzhen (CN)

( * ) Notice: Subject to any disclaimer, the term of this patent is extended or adjusted under 35 U.S.C. 154(b) by 281 days.

(21) Appl. No.: 16/287,026

(22) Filed: Feb. 27, 2019

(65) Prior Publication Data
US 2020/0201352 A1    Jun. 25, 2020

(30) Foreign Application Priority Data
Dec. 21, 2018   (CN) .................... 201811571738.8

(51) Int. Cl.
| | |
|---|---|
| B25J 9/16 | (2006.01) |
| G05D 1/02 | (2020.01) |
| B25J 11/00 | (2006.01) |
| G05D 1/00 | (2006.01) |

(52) U.S. Cl.
CPC .......... *G05D 1/0274* (2013.01); *B25J 9/1664* (2013.01); *B25J 11/0085* (2013.01); *G05D 1/0044* (2013.01)

(58) Field of Classification Search
CPC ... G05D 1/0274; G05D 1/0044; B25J 9/1664; B25J 9/1666; B25J 9/1661; B25J 11/0085; B25J 5/00; B25J 5/007; B25J 5/02
See application file for complete search history.

(56) References Cited

U.S. PATENT DOCUMENTS

| | | | | |
|---|---|---|---|---|
| 2005/0010331 A1* | 1/2005 | Taylor | ................. | G05D 1/0219 700/245 |
| 2008/0300745 A1* | 12/2008 | Goossen | .............. | G05D 1/0044 701/25 |
| 2012/0125363 A1* | 5/2012 | Kim | ...................... | A47L 9/2852 134/6 |

(Continued)

FOREIGN PATENT DOCUMENTS

| | | |
|---|---|---|
| CN | 104133476 A | 11/2014 |
| CN | 108037699 A | 5/2018 |
| CN | 108673496 A | 10/2018 |

OTHER PUBLICATIONS

Extended European Search Report dated Nov. 13, 2019, in connection with corresponding EP Application No. 19164650 4 (8 pgs ).

(Continued)

*Primary Examiner* — Khoi H Tran
*Assistant Examiner* — Nhi Q Bui
(74) *Attorney, Agent, or Firm* — Maier & Maier, PLLC

(57) ABSTRACT

A method and a device for displaying a motion path of robot and a robot. The method for displaying a motion path of the robot includes acquiring a current motion path of the robot, recognizing the motion path to determine a type of the motion path, determining, according to the type of the motion path, a display manner corresponding to the type of the motion path, and displaying the motion path on an electronic map in the determined display manner.

9 Claims, 4 Drawing Sheets

(56) References Cited

U.S. PATENT DOCUMENTS

2017/0102709 A1* 4/2017 Kwak .................. A47L 9/2847

OTHER PUBLICATIONS

Sherman Y. T. Lang, et al., "Coordination of Behaviours for Mobile Robot Floor Cleaning", Proceedings of the 1998 IEEE/RSJ Intl. Conference on Intelligent Robots and Systems, Victoria, B.C., Canada, Oct. 1998, pp. 1236-1241 (6 pgs.).

* cited by examiner

METHOD AND DEVICE FOR DISPLAYING MOTION PATH OF ROBOT AND ROBOT

CROSS-REFERENCES TO RELATED APPLICATION

This application claims priority to Chinese Patent Application 201811571738.8, filed on Dec. 21, 2018, the content of which is incorporated herein by reference in its entirety.

TECHNICAL FIELD

The present disclosure relates to the field of robot technology, and in particular, to a method and a device for displaying a motion path of the robot, a robot and a computer readable storage medium.

BACKGROUND

With the development of society, people's requirements for indoor environment are getting higher and higher, and smart household appliances represented by cleaning robots gradually appear in people's daily life.

The cleaning path (such as the edge path, the serpentine path) and the auxiliary path (such as the transition path and the escape path) of the cleaning robot are usually displayed on an electronic map simultaneously. When the two types of paths are displayed on the same electronic map without a difference, the paths displayed on the entire map interface will look messy, and the user cannot distinguish between the cleaning path and the auxiliary path, thereby affecting the display effect of the map and the user experience.

Therefore, it is necessary to propose a new technical solution to solve the above technical problem.

SUMMARY

In view of this, the embodiments of the present disclosure provide a method and a device for displaying a motion path of a robot and a robot, which are convenient for the user to quickly distinguish between the cleaning path and the auxiliary path, thereby improving the user experience.

According to a first aspect, the present disclosure provides a method for displaying a motion path of a robot, including:

acquiring a current motion path of the robot;

recognizing the motion path to determine a type of the motion path;

determining, according to the type of the motion path, a display manner corresponding to the type of the motion path; and displaying the motion path on an electronic map in the determined display manner.

According to a second aspect, the present disclosure provides a device for displaying a motion path of a robot, includes:

an acquisition module configured to acquire a current motion path of the robot;

a recognition module configured to recognize the motion path to determine a type of the motion path;

a determination module configured to determine, according to the type of the motion path, a display manner corresponding to the type of the motion path; and a display module configured to display the motion path on an electronic map in the determined display manner.

According to a third aspect, the present disclosure provides a robot including a memory, a processor, and a computer program stored in the memory and operable in the processor, where the processor is configured to execute the computer program to implement the steps of the method according to the first aspect as described above.

According to a fourth aspect, the present disclosure provides computer readable storage medium with a computer program stored therein, where when the computer program is executed by a processor, steps of the method according to the first aspect as described above are implemented.

The beneficial effects of the embodiment of the present disclosure compared with the prior art include: in an embodiment, a current motion path of the robot is firstly acquired, the motion path is then recognized to determine a type of the motion path, a display manner corresponding to the type of the motion path is then determined according to the type of the motion path, and finally the motion path is displayed on an electronic map in the determined display manner. Compared with the prior art, in the present disclosure, different types of motion paths may be distinguishably displayed on the electronic map in the display manners corresponding to the types of the motion paths, which not only helps to improve the display effect of the map, but also helps the user to quickly distinguish the clean path and the auxiliary path, thereby improving the user experience. Thus, the present disclosure has the advantages of high ease of use and practicability.

BRIEF DESCRIPTION OF THE DRAWINGS

In order to more clearly illustrate the technical solutions in the embodiments of the present disclosure, the drawings used in the description of the embodiments will be briefly described below. It is obvious that the drawings in the following description are just some embodiments of the present disclosure, those skilled in the art can also obtain other drawings based on these drawings without paying any creative effort.

DETAILED DESCRIPTION

Figure 1:
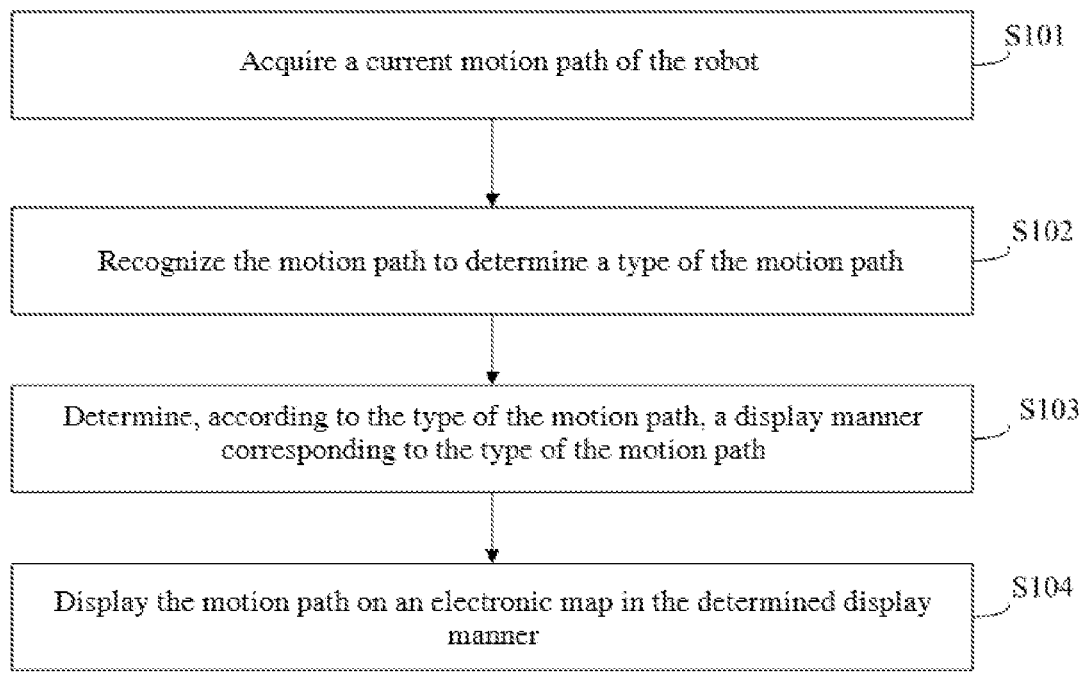
FIG. 1 is a schematic flowchart of a method for displaying a motion path of a robot according to a first embodiment of the present disclosure.

In the following description, in order to describe but not intended to limit, concrete details such as specific system structure, technique, and so on are proposed, thereby facilitating comprehensive understanding of the embodiments of the present application. However, it will be apparent to the ordinarily skilled one in the art that, the present application can also be implemented in some other embodiments without these concrete details. In some other conditions, detailed explanations of method, circuit, device and system well known to the public are omitted, so that unnecessary details can be prevented from obstructing the description of the present application.

It should be understood that, when a term "comprise/include" is used in the description and annexed claims, the term "comprise/include" indicates the existence of the described characteristics, integer, steps, operations, elements and/or components, but not exclude the existence or adding of one or more other characteristics, integer, steps, operations, elements, components and/or combination thereof.

It should also be understood that, terms used in the description of the present application are for the purpose of describing specific embodiments but not intended to limit the present application. As is used in the description and the annexed claims of the present application, unless other conditions are indicated clearly in the context, otherwise, singular forms of terms such as "a", "one", "the" are intended to include plural forms.

It should be further understood that, terms "and/or" used in the description and the annexed claims of the present application are referred to as any combination of one or a plurality of listed item(s) associated with each other and all possible items, and including these combinations.

As is used in the description and the annexed claims, a term "if" can be interpreted as "when" or "once" or "in response to determination" or "in response to detection". Similarly, terms such as "if it is determined that", or "if it is detected that (a described condition or event)" can be interpreted as "once it is determined" or "in response to the determination" or "once it is detected that (the described condition or event)" or "in response to the detection (the described condition or event)".

It should be understood that, values of serial numbers of the steps in the above embodiments don't mean the execution sequence of the steps, the execution sequence of the steps should be determined by its function and internal logics, and should not be construed as limiting the implementation process of the embodiments of the present application.

It should be noted that the expression of "first", "second" and the like in this embodiment are used to distinguish different regions, modules, etc., and does not represent the sequential order, and are not limited to different types either.

In order to explain the technical solutions described in the present disclosure, the following description will be made by way of specific embodiments.

First Embodiment

FIG. 1 is a schematic flowchart of a method for displaying a motion path of a robot according to a first embodiment of the present disclosure, and the method may include the following steps of S101 to S104.

In S101, a current motion path of the robot is acquired.

The robot mainly refers to a smart cleaning robot, including a sweeping robot, a mopping robot, an automatic sweeper, a smart vacuum cleaner, etc., which is a kind of smart household appliances, and can automatically plan a cleaning path in a room by using artificial intelligence so as to complete the cleaning of the ground.

In an embodiment, the motion path includes a cleaning path and an auxiliary path.

It should be understood that in the process of cleaning, the cleaning robot firstly cleans the edge area along the edge and constructs the environment map, then plans the cleaning path according to the constructed environment map, and finally cleans the area according to the planned cleaning path.

In an embodiment, the robot divides the constructed environmental map into a plurality of sub-areas to be cleaned according to the position of the obstacle.

In one embodiment, the robot cleans the plurality of sub-areas to be cleaned in a predetermined order.

It should be noted that the cleaning path includes, but is not limited to, an edge cleaning path and a planned area cleaning path. The auxiliary path is the path other than the cleaning path in the motion path, including but not limited to a transition path, an escape path, and a recharge path.

The transition path refers to the motion path generated by the robot moving from the current area to another area to be cleaned. The escape path refers to the motion path generated by the robot in order to break free of the obstacle after being entangled by the obstacle. The recharge path is the path along which the robot can return from the current position to the charger.

It should be understood that none of the above paths is a normal cleaning path, and each is a motion path that must be generated to assist the robot in continuing to complete subsequent cleaning tasks.

In S102, the motion path is recognized to determine a type of the motion path.

In an embodiment, the shape of the motion path may be recognized by using any existing or future possible methods.

In S103, a display manner corresponding to the type of the motion path is determined according to the type of the motion path.

In order to facilitate the user to accurately and quickly distinguish different types of motion paths, it is necessary to determine display manners corresponding to the types of the motion paths according to the types of the motion paths.

In S104, the motion path is displayed on an electronic map in the determined display manner.

The electronic map includes the environment map constructed by the cleaning robot during the edge cleaning process.

It can be seen that, in the embodiment, a current motion path of the robot is firstly acquired, the motion path is then recognized to determine a type of the motion path, a display manner corresponding to the type of the motion path is then determined according to the type of the motion path, and finally the motion path is displayed on an electronic map in the determined display manner. Compared with the prior art, in the present disclosure, different types of motion paths may be distinguishably displayed on the electronic map in the display manners corresponding to the types of the motion paths, which not only helps to improve the display effect of the map, but also helps the user to quickly distinguish the clean path and the auxiliary path, thereby improving the user experience and having the advantages of high ease of use and practicability.

Second Embodiment

Figure 2:
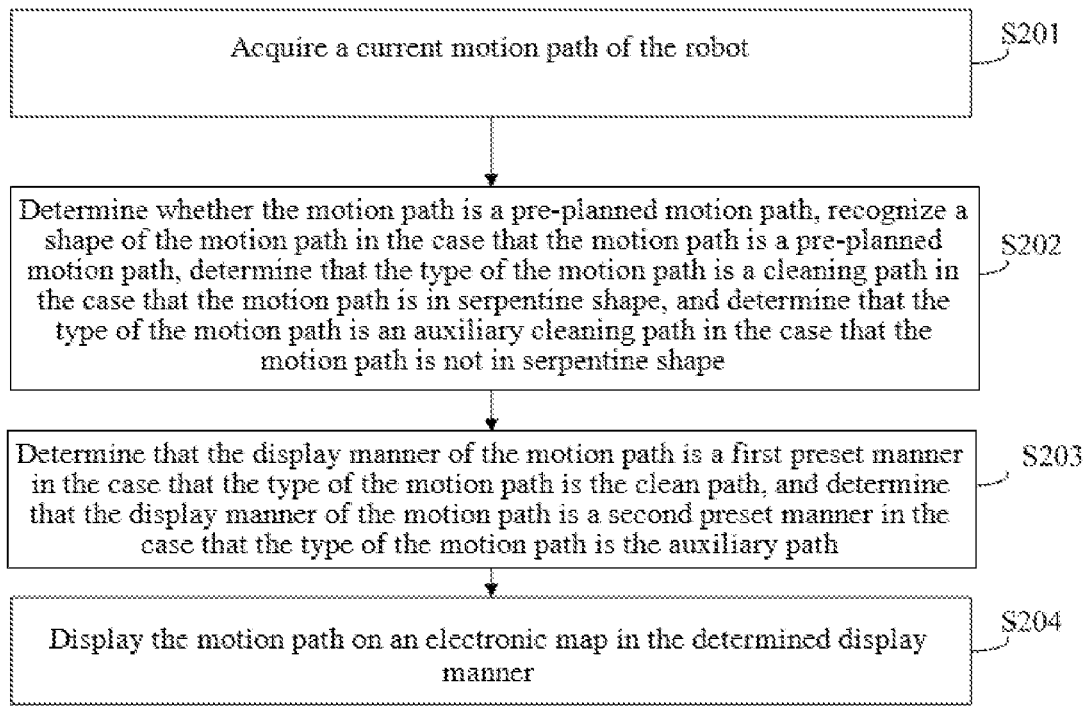
FIG. 2 is a schematic flowchart of a method for displaying a motion path of a robot according to a second embodiment of the present disclosure.

FIG. 2 is a schematic flowchart of a method for displaying a motion path of a robot according to a second embodiment of the present disclosure, which includes further refinement and description of step S102 in the first embodiment, and the method may include the following steps of S201 to S204.

In S201, a current motion path of the robot is acquired.

The step S201 is the same as the step S101 in the first embodiment. For the specific implementation process, the description of step S101 may be referred to and details are not repeatedly described herein.

In S202, it is determined whether the motion path is a pre-planned motion path and a shape of the motion path is recognized in the case that the motion path is a pre-planned motion path. And it is determined that the type of the motion path is a cleaning path in the case that the motion path is in serpentine shape and it is determined that the type of the motion path is an auxiliary path in the case that the motion path is not in serpentine shape.

It should be noted that in order to improve the cleaning efficiency, before the area cleaning, the robot usually pre-plans the corresponding cleaning path and the transition path according to the environment map constructed during the edge cleaning process and stores the paths locally. After comparing the current motion path with the locally stored pre-planned motion paths, the robot can determine whether the current motion path is a pre-planned motion path.

In addition, considering that when the robot is planning the motion path the cleaning path is usually planned into a serpentine shape path and in order to reach another area as soon as possible to start cleaning the transition path is often planned into various shapes as needed, such as the common arc. Therefore, whether the current motion path is a cleaning path can be determined by determining whether the planned motion path is in serpentine shape, such that the type of the current motion path can be acquired.

In S203, it is determined that the display manner of the motion path is a first preset manner in the case that the type of the motion path is the clean path and it is determined that the display manner of the motion path is a second preset manner in the case that the type of the motion path is the auxiliary path.

In an embodiment, the first preset manner is different from the second preset manner.

In an embodiment, the cleaning path is displayed in red lines and the auxiliary path is displayed in white lines.

In an embodiment, the cleaning path is displayed in red lines and the auxiliary path is displayed in dark red lines.

In an embodiment, the cleaning path is displayed in solid lines and the auxiliary path is displayed in dashed lines.

In an embodiment, the cleaning path is displayed in thick lines and the auxiliary path is displayed in thin lines.

In an embodiment, the cleaning path is displayed in any manner and the auxiliary path is hidden.

In S204, the motion path is displayed on an electronic map in the determined display manner.

The step 204 is the same as the step S104 in the first embodiment. For the specific implementation process, reference may be made to the description of step S104 and details are not repeatedly described herein.

It can be seen that, in the second embodiment of the present disclosure, a specific implementation manner for determining the type of the motion path is provided, in which the type of the motion path can be determined by recognizing the shape of the motion path after it is determined that the motion path is a pre-planned motion path, which is advantageous for accurately determining the type of the motion path so as to differently display the motion path on the electronic map, thereby having the advantages of high ease of use and practicability.

Third Embodiment

Figure 3:
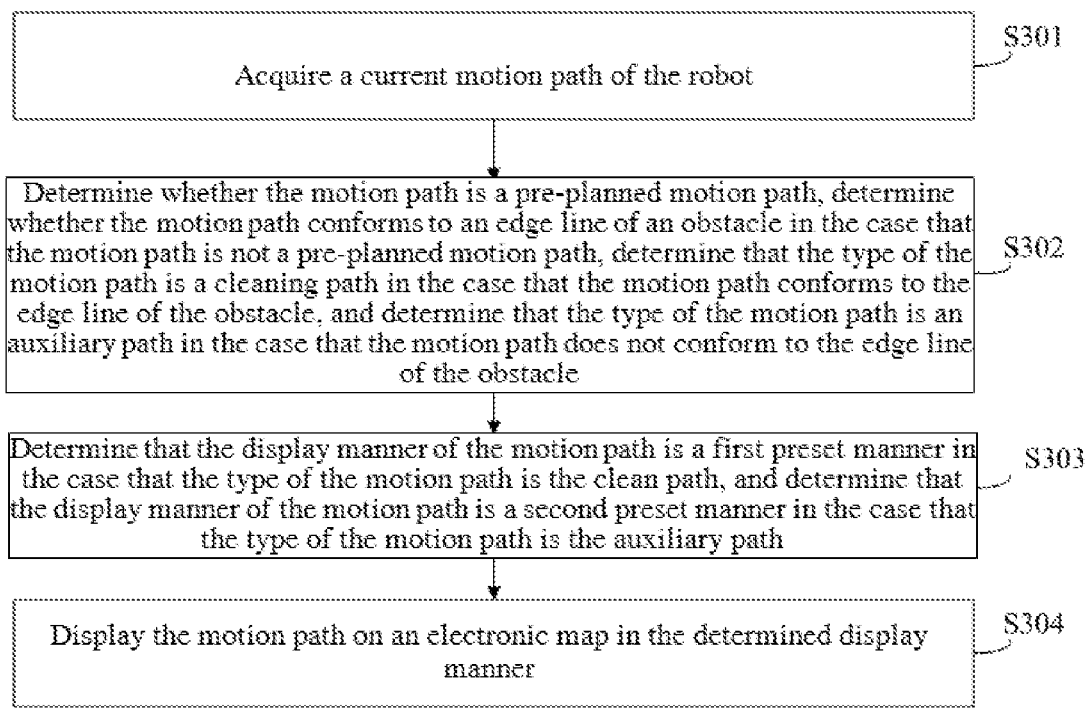
FIG. 3 is a schematic flowchart of a method for displaying a motion path of a robot according to a third embodiment of the present disclosure.

FIG. 3 is a schematic flowchart of a method for displaying a motion path of a robot according to the third embodiment of the present disclosure, which includes further refinement and description of step S102 in the first embodiment, and the method may include the following step of S301 to S304.

In S301, a current motion path of the robot is acquired.

The step S301 is the same as the step S101 in the first embodiment. For the specific implementation process, reference may be made to the description of step S101 and the details are not repeatedly described herein.

In S302, whether the motion path is a pre-planned motion path is determined, and whether the motion path conforms to an edge line of an obstacle is determined in the case that the motion path is not a pre-planned motion path. It is determined that the type of the motion path is a cleaning path in the case that the motion path conforms to the edge line of the obstacle and it is determined that the type of the motion path is an auxiliary path in the case that the motion path does not conform to the edge line of the obstacle.

For the determination of whether the motion path is a pre-planned motion path in step S302, reference may be made to the related description of step S202 in the second embodiment and details are not repeatedly described herein.

It should be noted that when the motion path is not a pre-planned motion path, it can be determined that the robot currently is performing edge cleaningsearching for a recharge path, or avoiding an obstacle, instead of performing the area cleaning. At this time, by determining whether the motion path conforms to the edge line of the obstacle, it may be further determined whether the motion path is an edge cleaning path. If the motion path is an edge cleaning path, it may be considered as a cleaning path that requires an emphasis display according to the present disclosure, if the motion path does not conform to the edge line of the obstacle, it may be considered as an auxiliary cleaning path that does not require an emphasis according to the present disclosure.

In S303, it is determined that the display manner of the motion path is a first preset manner in the case that the type of the motion path is the clean path and it is determined that the display manner of the motion path is a second preset manner in the case that the type of the motion path is the auxiliary path.

In S304, the motion path is displayed on an electronic map in the determined display manner.

The steps S303 and S304 are the same as the steps S203 and S204 in the second embodiment. For the specific implementation process, reference may be made to the description of the steps S203 and S204, and details are not repeatedly described herein.

It can be seen from the above that compared to the first embodiment, in the third embodiment of the present application a specific implementation manner for determining the type of the motion path is provided, in which the type of the motion path can be determined by determining whether the motion path conforms to an edge line of an obstacle after it is determined that the motion path is a pre-planned motion path, which is advantageous for accurately determining the type of the motion path so as to differently display the motion path on the electronic map, thereby having the advantages of high ease of use and practicability.

Fourth Embodiment

Figure 4:
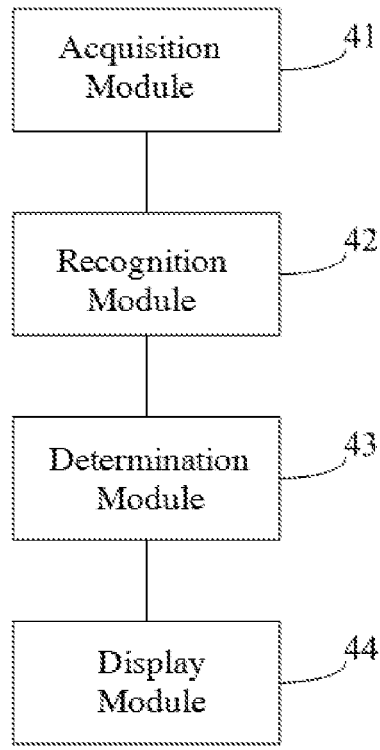
FIG. 4 is a schematic diagram of a device for displaying a motion path of a robot according to a fourth embodiment of the present disclosure.

FIG. 4 is a schematic diagram of a device for displaying a motion path of a robot according to a fourth embodiment of the present disclosure. For convenience of description, only parts related to this embodiment of the present disclosure are shown.

The device for displaying a movement path of a robot may be a software unit, a hardware unit or a unit combined with software and hardware built in the robot, or may be integrated into the robot as an independent widget.

The device for displaying a movement path of a robot includes:

an acquisition module 41, which is configured to acquire a current motion path of the robot;

a recognition module 42, which is configured to recognize the motion path to determine a type of the motion path;

a determination module 43, which is configured to determine, according to the type of the motion path, a display manner corresponding to the type of the motion path; and a display module 44, which is configured to display the motion path on an electronic map in the determined display manner.

In an embodiment, the determination module 43 specifically includes:

a first judge unit, which is configured to determine whether the motion path is a pre-planned motion path;

a recognition unit, which is configured to recognize a shape of the motion path in the case that the motion path is a pre-planned motion path;

a first determination unit, which is configured to determine that the type of the motion path is a cleaning path in the case that the motion path is in serpentine shape; and a second determination unit, which is configured to determine that the type of the motion path is an auxiliary cleaning path in the case that the motion path is not in serpentine shape.

In an embodiment, the determination module 43 further includes:

a second judge unit, which is configured to determine whether the motion path is a pre-planned motion path;

a third judge unit, which is configured to determine whether the motion path conforms to an edge line of an obstacle in the case that the motion path is not a pre-planned motion path;

a third determination unit, which is configured to determine that the type of the motion path is a cleaning path in the case that the motion path conforms to the edge line of the obstacle; and a fourth determination unit, which is configured to determine that the type of the motion path is an auxiliary path in the case that the motion path does not conform to the edge line of the obstacle.

In an embodiment, the determination module 43 further includes:

a fifth determination unit, which is configured to determine that the display manner of the motion path is a first preset manner in the case that the type of the motion path is the clean path; and a sixth determining unit, which is configured to determine that the display manner of the motion path is a second preset manner in the case that the type of the motion path is the auxiliary path.

In an embodiment, the first preset manner includes displaying the cleaning path on the electronic map, and the second preset manner includes hiding the auxiliary path on the electronic map.

Fifth Embodiment

Figure 5:
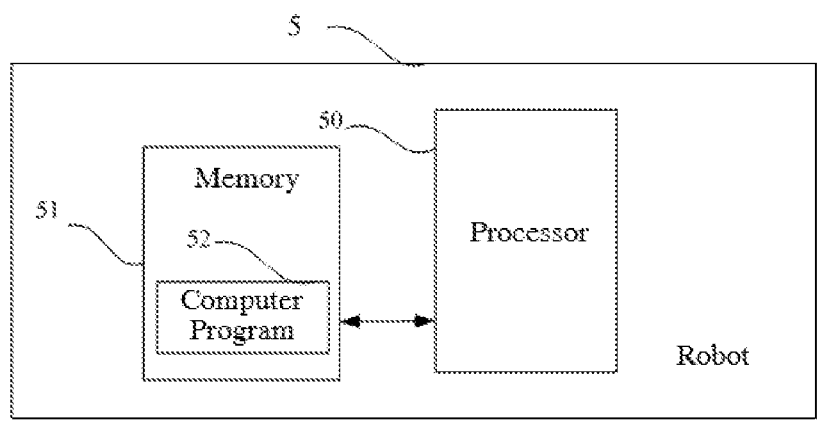
FIG. 5 is a schematic diagram of a robot according to a fifth embodiment of the present disclosure.

FIG. 5 is a schematic structural diagram of a robot according to the fifth embodiment of the present disclosure. As shown in FIG. 5, the robot 5 according to this embodiment includes a processor 50, a memory 51, and a computer program 52 stored in the memory 51 and operable in the processor 50. When the processor 50 executes the computer program 52, the steps in the first embodiment of the method, such as steps S101 to S104 shown in FIG. 1, are implemented, or the steps in the second embodiment of the method, such as steps S201 to S204 shown in FIG. 2, are implemented, or the steps in the third embodiment of the method, such as steps S301 to S304 shown in FIG. 3, are implemented. When the processor 50 executes the computer program 52, the functions of the modules/units in each of the apparatus embodiments described above, such as the functions of the modules 41 to 44 shown in FIG. 4, are implemented.

Illustratively, the computer program 52 may be divided into one or more modules/units that are stored in the memory 51 and executed by the processor 50 to complete this invention. The one or more modules/units may be a series of computer program instruction segments capable of performing a particular function, the instruction segments being used to describe the execution of the computer program 52 in the robot 5. For example, the computer program 52 may be divided into an acquisition module, a recognition module, a determination module and a display module, and the specific functions of the respective modules are as follows.

The acquisition module is configured to acquire a current motion path of the robot.

The recognition module is configured to recognize the motion path to determine a type of the motion path.

The determination module is configured to determine, according to the type of the motion path, a display manner corresponding to the type of the motion path.

The display module is configured to display the motion path on an electronic map in the determined display manner.

The robot may include, but is not limited to, the processor 50 and the memory 51. It will be understood by those skilled in the art that FIG. 5 is merely an example of the robot 5, does not constitute a limitation of the robot 5, may include more or less components than those illustrated, or may combine some components, or may include different components. For example, the terminal device may further include an input/output device, a network access device, a bus, a display, and the like.

The processor 50 may be CPU (Central Processing Unit), and may alternatively be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor may be a microprocessor, or alternatively, the processor may be any conventional processor and so on.

The memory 51 may be an internal storage unit of the robot 10, such as a hard disk or an internal memory of the robot 10. The memory 51 may alternatively be an external storage device of the robot 10, such as a plug-in hard disk, a SMC (Smart Media Card), a SD (Secure Digital) card, a FC (Flash Card), equipped on the robot 10. Further, the memory 51 may include both the internal storage unit and the external storage device of the robot 10. The memory 51 is configured to store the computer programs, and other procedures and data needed by the robot 10 for determining wellbore cross-sectional shape. The memory 51 may also be configured to store data that has been output or being ready to be output temporarily.

A person skilled in the art can clearly understand that, for the convenience and brevity of the description, for the specific working process of the system, the device and the unit described above, reference may be made to the corresponding process in the above-described method embodiment, and details are not described herein again.

In the above-described embodiments, the descriptions of various embodiments have their own focus, and for the parts that are not detailed or described in a certain embodiment reference may be made to the related descriptions of other embodiments.

The ordinarily skilled one in the art may aware that, the modules, units and/or method steps of each of the examples described in connection with the embodiments disclosed herein may be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present application.

It should be understood that, in the embodiments of the present application, the disclosed system, device and method could be implemented in other ways. For example, the device described above are merely illustrative; for example, the division of the units is only a logical function division, and other division could be used in the actual implementation, for example, multiple units or components could be combined or integrated into another system, or some features can be ignored, or not performed. In another aspect, the coupling or direct coupling or communication connection shown or discussed could be through some interfaces, and indirect coupling or communication connection between devices or units may be electrical, mechanical, or in other manners.

The units described as separate components could or could not be physically separate, the components shown as units could or could not be physical units, which can be located in one place, or can be distributed to multiple network elements. Parts or all of the elements could be selected according to the actual needs to achieve the object of the present embodiment.

In addition, the various functional units in each of the embodiments of the present application can be integrated into a single processing unit, or exist individually and physically, or two or more than two units are integrated into a single unit. The aforesaid integrated unit can either be achieved by hardware, or be achieved in the form of software functional units.

If the integrated unit is achieved in the form of software functional units, and is sold or used as an independent product, it can be stored in a computer readable storage medium. Based on this understanding, a whole or part of flow process of implementing the method in the aforesaid embodiments of the present application can also be accomplished by using computer program to instruct relevant hardware. When the computer program is executed by the processor, the steps in the various method embodiments described above can be implemented. Wherein, the computer program comprises computer program codes, which can be in the form of source code, object code, executable documents or some intermediate form, etc. The computer readable medium can include: any entity or device that can carry the computer program codes, recording medium, USB flash disk, mobile hard disk, hard disk, optical disk, computer storage device, ROM (Read-Only Memory), RAM (Random Access Memory), electrical carrier signal, telecommunication signal and software distribution medium, etc. It needs to be explained that, the contents contained in the computer readable medium can be added or reduced appropriately according to the requirement of legislation and patent practice in a judicial district, for example, in some judicial districts, according to legislation and patent practice, the computer readable medium doesn't include electrical carrier signal and telecommunication signal.

As stated above, the aforesaid embodiments are only intended to explain but not to limit the technical solutions of the present application. Although the present application has been explained in detail with reference to the above-described embodiments, it should be understood for the ordinary skilled one in the art that, the technical solutions described in each of the above-described embodiments can still be amended, or some technical features in the technical solutions can be replaced equivalently; these amendments or equivalent replacements, which won't make the essence of corresponding technical solution to be broken away from the spirit and the scope of the technical solution in various embodiments of the present application, should all be included in the protection scope of the present application.

What is claimed is:

1. A method for displaying a motion path of a robot, comprising:
   acquiring a current motion path of the robot;
   recognizing the motion path to determine a type of the motion path, wherein the type of the motion path comprises a cleaning path and an auxiliary path, the cleaning path further comprises an edge cleaning path and a planed area cleaning path, the auxiliary path further comprises a transition path, an escape path and a recharge path;
   determining, according to the type of the motion path, a display manner corresponding to the type of the motion path; and
   displaying the motion path on an electronic map in the determined display manner;
   wherein the step of recognizing the motion path to determine the type of the motion path comprises:
   determining whether the motion path is a pre-planned motion path;
   determining whether the motion path conforms to an edge line of an obstacle if the motion path is not the pre-planned motion path;
   determining that the type of the motion path is the cleaning path if the motion path conforms to the edge line of the obstacle; or
   determining that the type of the motion path is the auxiliary path if the motion path does not conform to the edge line of the obstacle.

2. The method according to claim 1, wherein the step of recognizing the motion path to determine the type of the motion path comprises:
   determining whether the motion path is a pre-planned motion path;
   recognize a shape of the motion path if the motion path is the pre-planned motion path;
   determining that the type of the motion path is the cleaning path if the motion path is in serpentine shape; and
   determining that the type of the motion path is the auxiliary path if the motion path is not in serpentine shape.

3. The method according to claim 2, wherein the step of determining the display manner corresponding to the type of the motion path according to the type of the motion path comprises:
   determining that the display manner of the motion path is a first preset manner if the type of the motion path is the cleaning path; and
   determining that the display manner of the motion path is a second preset manner that if the type of the motion path is the auxiliary path.

4. The method according to claim 3, wherein the first preset manner comprises displaying the cleaning path on the electronic map, and the second preset manner comprises hiding the auxiliary path on the electronic map.

5. A robot comprising a memory, a processor, and a computer program stored in the memory and operable in the processor, wherein the processor is configured to execute the computer program to implement steps of the method according to claim 1.

6. The method according to claim 1, wherein steps of determining the display manner corresponding to the type of the motion path according to the type of the motion path comprises:
- determining that the display manner of the motion path is a first preset manner if the type of the motion path is the cleaning path; and
- determining that the display manner of the motion path is a second preset manner if the type of the motion path is the auxiliary path.

7. The method according to claim 6, wherein the first preset manner comprises displaying the cleaning path on the electronic map, and the second preset manner comprises hiding the auxiliary path on the electronic map.

8. The method according to claim 1, further comprising:
- cleaning an edge area along an edge and constructing an environmental map, planning the cleaning path according to the constructed environmental map; and cleaning an area according to the planned cleaning path by the robot in a cleaning process.

9. The method according to claim 8, further comprising:
- dividing the constructed environmental map into a plurality of sub-areas to be cleaned according to a position of the obstacle, and cleaning the plurality of sub-areas to be cleaned in a predetermined order by the robot.

* * * * *